(12) United States Patent
Yang et al.

(10) Patent No.: US 8,839,195 B2
(45) Date of Patent: Sep. 16, 2014

(54) METHOD, SYSTEM AND TERMINAL FOR LOCATING

(75) Inventors: Yongli Yang, Shenzhen (CN); Wei Lu, Shenzhen (CN); Wanqing Nan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 92 days.

(21) Appl. No.: 13/552,424

(22) Filed: Jul. 18, 2012

(65) Prior Publication Data

US 2013/0024838 A1  Jan. 24, 2013

Related U.S. Application Data

(63) Continuation of application No. PCT/CN2011/077285, filed on Jul. 18, 2011.

(51) Int. Cl.
*G06F 9/44* (2006.01)
*G06F 9/455* (2006.01)

(52) U.S. Cl.
CPC ............. *G06F 9/45512* (2013.01); *G06F 8/30* (2013.01)
USPC .......................................... 717/115; 717/106

(58) Field of Classification Search
None
See application file for complete search history.

(56) References Cited

U.S. PATENT DOCUMENTS 7,543,267 B2 * 6/2009 Lindhorst et al. ............. 717/105

* cited by examiner

*Primary Examiner* — Chuck Kendall
(74) *Attorney, Agent, or Firm* — Brinks Gilson & Lione

(57) ABSTRACT

A method, a system, and a WEB client for editing scripting language based on WEB are disclosed. The method including: querying a server about available object in a current script usage scenario, and its attribute and method; generating a script editing interface according to the queried available object and its the attribute and method, and displaying a script content input by an inputting device in the editing interface; acquiring confirmation identifier of the edited content, and checking whether or not the script content before the confirmation identifier is an indication object capable of automatically indicating; if so, acquiring, from the attribute and method of the available object, an attribute and method related to the indication object, and displaying them on a prompt box formed in the script editing interface for selection; and adding the attribute and method of the indication object selected from the prompt box after the indication object.

19 Claims, 9 Drawing Sheets

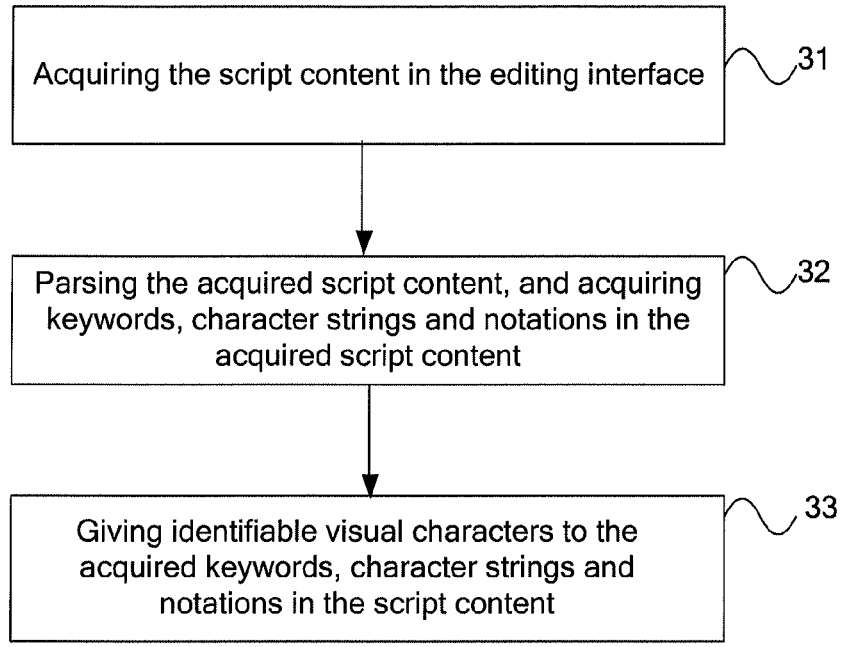

Acquiring the script content in the editing interface — 31

Parsing the acquired script content, and acquiring keywords, character strings and notations in the acquired script content — 32

Giving identifiable visual characters to the acquired keywords, character strings and notations in the script content — 33

FIG.3

```
Rule    Remark    Sample
def main(result):
    #Judge the on net duration of a subscriber exceeded 12 months or not.
    active_date = Subscriber.getAttribute("ACTIVEDATE").asString()
    #This is comments
    "This is a string"
```

FIG.4

Determining whether or not the input script content is wrapped; if so, it means that it is necessary to add an indentation of one level to the input script content; and if not, making the indentation of the input script content consistent with the indentation of the script content of last line  — 51

After wrapping, inserting a space necessary for the indentation, and shifting the cursor to the position after indentation  — 52

FIG.5

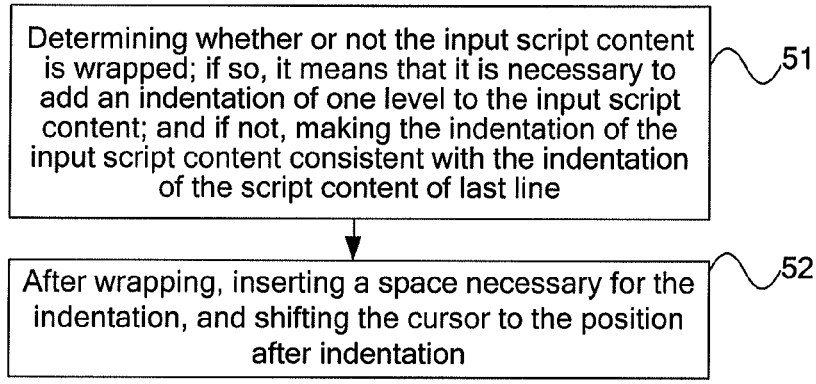

FIG.6

Checking whether or not the script content complies with grammar, and if not, feeding back error type, error indication information and/or error position information, and indicating the error position in the script editing area with highlighted red background  — 71

Checking whether or not the service character of the script content meets corresponding service rules according to different using scenarios, if not, feeding back error type, error indication information and/or error position information, and indicating the error position in the script editing area with highlighted red background; and if so, indicating that the scrip content meets service characteristic and can be stored  — 72

FIG.7

Copying existing script content to a script editor    91

Filtering out such additional data as DOM nodes and pictures in the copied script content, extracting the plain text content, and pasting it as a new script content    92

METHOD, SYSTEM AND TERMINAL FOR LOCATING

CROSS-REFERENCE TO RELATED APPLICATIONS

This application is a continuation of International Application No. PCT/CN2011/077285, filed on 18, Jul. 2011, which is incorporated herein by reference in its entirety.

TECHNICAL FIELD

The present invention relates to communication technologies, and in particular to a method, a system, and a WEB client for editing scripting language based on WEB.

BACKGROUND

As the development of telecommunications services business, there is a demand for realizing more flexible control capabilities of data and flows by the WEB managing client. Abundant expressions of scripting language may achieve such an object and in particular, a script running engine may be implemented at a business end, and scripts may be edited and managed at a management end.

In a BMP system, an editing script with customized expression is widely used. The format of the customized expression is fixed with unitary expression, which is only capable of performing relatively simple logical operation, such as size comparison, etc., but cans not support functions and flow control.

SUMMARY

The embodiments of the present invention provide a method, a system and a device for editing scripting language based on WEB to solve the problems in the currently related art that the scripting language can only perform relatively simple logical operations such as size comparison, etc., but can not support functions and flow control.

In order to solve the above technical problems, the embodiments of the present invention provide the following technical solutions:

According to one aspect of the present invention, there is proposed a method for editing scripting language based on WEB, the method including: querying a server about available object in a current script usage scenario, as well as attribute and method of the available object; generating a script editing interface according to the queried available object in the current script usage scenario and the attribute and method of the available object, and displaying a script content input by an inputting device in the editing interface; acquiring confirmation identifier of the edited content, and checking whether or not the script content before the confirmation identifier is an indication object capable of automatically indicating; if so, acquiring, from the attribute and method of the available object, an attribute and method related to the indication object, and displaying the acquired attribute and method related to the indication object on a prompt box formed in the script editing interface for selection; and adding the attribute and method of the indication object selected from the prompt box after the indication object.

According to another aspect of the present invention, there is proposed a system for editing scripting language based on WEB, the system including a WEB client and a WEB server, the WEB server including a memory module, and the WEB client including a displaying module, an attribute and method querying module, an attribute and method indicating module, and an attribute and method adding module; the memory module configured to store available objects in various script usage scenarios, as well as attribute and method of the available object; the attribute and method querying module configured to query the memory module of the WEB server about an available object in a current script usage scenario, and attribute and method of the available object; the displaying module configured to generate a script editing interface according to the queried available object in the current script usage scenario and the attribute and method of the available object, and display a script content input by an inputting device in the editing interface; the attribute and method indicating module configured to acquire confirmation identifier of the edited content, and checking whether or not the script content before the confirmation identifier is an indication object capable of automatically indicating; if so, acquire, from the attribute and method of the available object, an attribute and method related to the indication object, and display the acquired attribute and method related to the indication object on a prompt box formed in the script editing interface for selection; and the attribute and method adding module configured to add the attribute and method of the indication object selected from the prompt box after the indication object.

According to still another aspect of the present invention, there is proposed a WEB client, the WEB client including: a displaying module, an attribute and method querying module, an attribute and method indicating module, and an attribute and method adding module; the attribute and method querying module configured to query the memory module of the WEB server about an available object in a current script usage scenario, and attribute and method of the available object; the displaying module configured to generate a script editing interface according to the queried available object in the current script usage scenario and the attribute and method of the available object, and display a script content input by an inputting device in the editing interface; the attribute and method indicating module configured to acquire confirmation identifier of the edited content, and checking whether or not the script content before the confirmation identifier is an indication object capable of automatically indicating; if so, acquire, from the attribute and method querying module, an attribute and method related to the indication object, and display the acquired attribute and method related to the indication object on a prompt box formed in the script editing interface for selection; and the attribute and method adding module configured to add the attribute and method of the indication object selected from the prompt box after the indication object.

It can be seen from above that in the implementation of the embodiments of the present invention, a online script IDE function is provided, which strongly supports the development and expansibility of the system, and may flexibly control complicated scenarios, dynamically indicating the attribute and method of the available object according to the using scenario of the script, automatically adding the selected attribute and method to an script object in editing, making the scripting language support functions and flow control, and improving the convenience of the user in editing.

BRIEF DESCRIPTION OF THE DRAWINGS

Drawings needed in the description of the embodiments and the prior art shall be explained below, so as to explain the technical solutions in the embodiments of the present inven

FIG. 3 is a flowchart of a second embodiment of the method for editing scripting language based on WEB of the present invention;

FIG. 4 is a schematic diagram of application of the method shown in FIG. 3;

FIG. 5 is a flowchart of a third embodiment of the method for editing scripting language based on WEB of the present invention;

FIG. 6 is a schematic diagram of application of the method shown in FIG. 5;

FIG. 7 is a flowchart of a fourth embodiment of the method for editing scripting language based on WEB of the present invention;

DETAILED DESCRIPTION

Detailed description is given below for the method, system and device for editing scripting language based on WEB.

The WEB-based scripting language edition of the embodiments of the present invention is based on a B/S (browser/server) architecture, and provides WEB-based script management capability to a user via browser-based rich client.

Figures 1, 2:
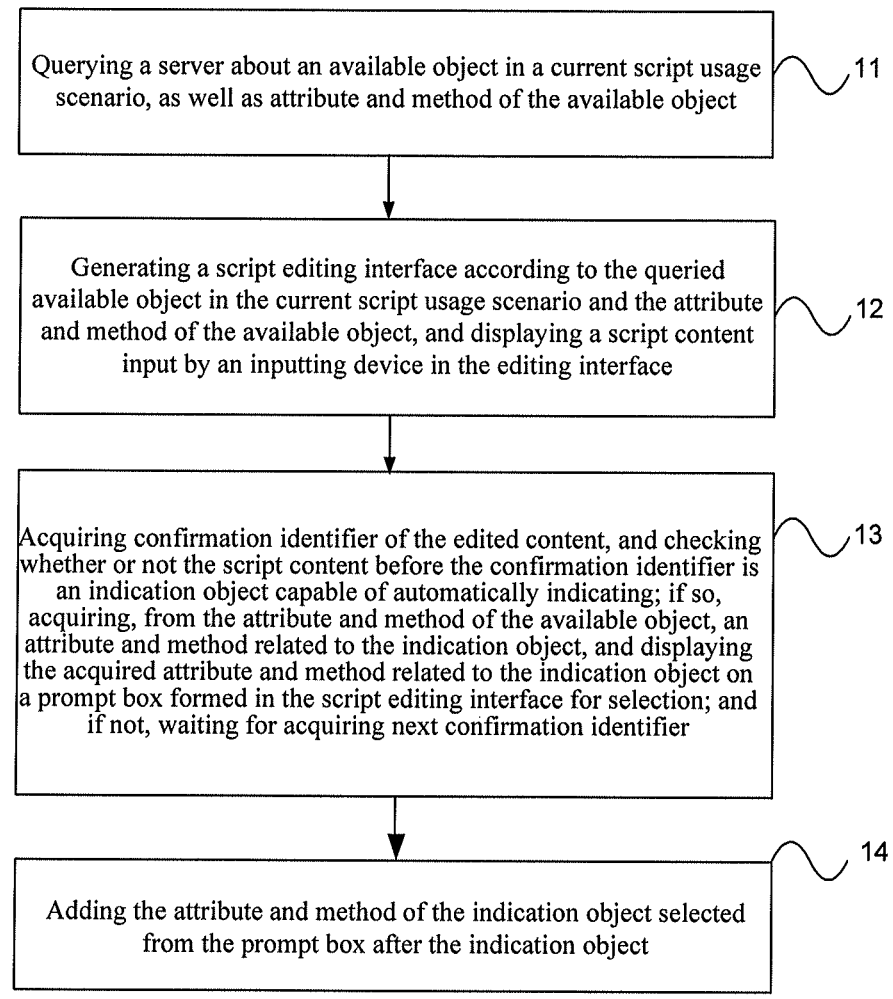
- FIG. 1 is a flowchart of a first embodiment of the method for editing scripting language based on WEB of the present invention.
FIG. 2 is a schematic diagram of application of the method shown in FIG. 1.

Referring to FIG. 1, the following describes a first embodiment of the method for editing scripting language based on WEB.

Step 11: querying a server about an available object in a current script usage scenario, as well as attribute and method of the available object.

According to a script usage scenario, a WEB client queries a server about an available object, and attribute and method of the available object, and temporarily stores them. Wherein, available objects in various script usage scenarios, and attributes and methods of the available objects are stored in a WEB server. In the embodiment of the present invention, an available object refers to an object predefined in a system that can be used by a script of the current scenario. In the script, an attribute value of the available object may be acquired, and a method of the available object may be called to perform operations. The available object is closely related to the functions of the system, and represents the functions that the system provides to the outside. A method of an available object refers to a method interface provided by the available object to a user, and it is possible to perform operations to the available object with the method.

Step 12: generating a script editing interface according to the queried available object in the current script usage scenario and the attribute and method of the available object, and displaying a script content input by an inputting device in the editing interface.

Step 13: acquiring confirmation identifier of the edited content, and checking whether or not the script content before the confirmation identifier is an indication object capable of automatically indicating; if so, acquiring, from the attribute and method of the available object, an attribute and method related to the indication object, and displaying the acquired attribute and method related to the indication object on a prompt box formed in the script editing interface for selection; and if not, waiting for acquiring next confirmation identifier.

In the embodiments of the present invention, the confirmation identifier is a separation symbol between an object and an object attribute or method. If a script is a Python script, the confirmation identifier is a dot symbol. When the WEB client detects that confirmation identifier is input, step 13 is performed. Referring to FIG. 2, the attribute and method of the object is displayed in an automatic prompt box 201 for selection by a user.

If there are many attributes and methods of the object and it is not convenient to display the automatic prompt box, in this embodiment, more input character strings are acquired in the content of the script, and the names of the methods in the prompt box may be filtered, so as to reduce options.

In this embodiment, it is also possible to acquire the character string from the script content that was later input into in the script editing interface, and the attribute and method displayed in the prompt box may be filtered by using the acquired character string, so as to reduce the number of the attributes and methods displayed in the automatic prompt box for facilitating view of user.

Step 14: adding the attribute and method of the indication object selected from the prompt box after the indication object.

The user may select desired attribute and method in the automatic prompt box by using the UP and DOWN keys of the keyboard and completes the selection by pressing the Tab key or Enter key. The automatic prompt box is automatically hidden upon the completion of the selection, and the automatic input is completed after the selected method or attribute is added after the object.

In this embodiment, the attribute and method of the available object are indicated dynamically according to the script usage scenario, and the automatically selected attribute and method are added to the script object being edited, thereby improving the convenience of the user in editing and reducing the load of memorization of the user.

A second embodiment of the method for editing scripting language based on WEB is shown in FIG. 3.

This embodiment is a supplementary method with respect to the first embodiment shown in FIG. 1, and in practice, this embodiment may be performed in synchronization with the first embodiment shown in FIG. 1.

Step 31: acquiring the script content in the editing interface.

Step 32: parsing the acquired script content, and acquiring keywords, character strings and notations in the acquired script content.

If the scripting language is a Python script, the keywords includes but not limited to "de", "if", "elif", "else", "and", "or", "not", "pass", "True", "False", "None", "return", and "is". The keywords are obtained by querying about the above terms in the script content. In a Python script, a character string is indexed by single quotation mark or double quotation marks. The character string may be obtained by extracting the script content indexed by the single quotation marks or double quotation marks. In a Python script, a notation often starts with a # mark, and occupies a line alone. A notation in the script is obtained by extracting the part staring from a # mark to the end of the line in the script content.

Step 33: giving identifiable visual characters to the acquired keywords, character strings and notations in the script content. Wherein, the identifiable visual characters comprise color, brightness, and font size, or a combination of two or three of color, brightness, and font size. Referring to FIG. 4, the keywords are marked with blue color, the character strings are marked with purple color, and the notations are marked with green color.

Types of different codes marks may be quickly distinguished by coloring based on grammar, so that the user grasps the edited content more easily. In this embodiment, the keywords, character strings and notations may be displayed with highlight in real-time in the script editing area, indicating the user in a more striking way.

A third embodiment of the method for editing scripting language based on WEB is shown in FIG. 5. This embodiment is a supplementary method with respect to the first embodiment shown in FIG. 1, and in practice, this embodiment may be performed in synchronization with the first embodiment shown in FIG. 1 and the second embodiment shown in FIG. 3.

Step 51: determining whether or not the input script content is wrapped; if so, it means that it is necessary to add an indentation of one level to the input script content; and if not, making the indentation of the input script content consistent with the indentation of the script content of last line.

Step 52: after wrapping, inserting a space necessary for the indentation, and shifting the cursor to the position after indentation.

Referring to FIG. 6, if the scripting language is a Python script, it is determined whether or not the last line is terminated with colon ":"; if so, it means that it is necessary to add an indentation of one level in the "if" branch or function definition code blocks; and if not, it means that the position of line is at the same level as the codes of the last line and its indentation should be consistent with the indentation of the last line. Because the Python script needs indentation to divide code blocks, the operation of automatic indentation after wrapping will reduce the odds of error in indentation made by the user, and improve the experiences of the user in editing the script.

A fourth embodiment of the method for editing scripting language based on WEB is shown in FIG. 7. This embodiment is a supplementary method with respect to the first embodiment shown in FIG. 1, and in practice, this embodiment may be performed in synchronization with the first embodiment shown in FIG. 1, the second embodiment shown in FIG. 3 and the third embodiment shown in FIG. 5.

Figures 8, 9:
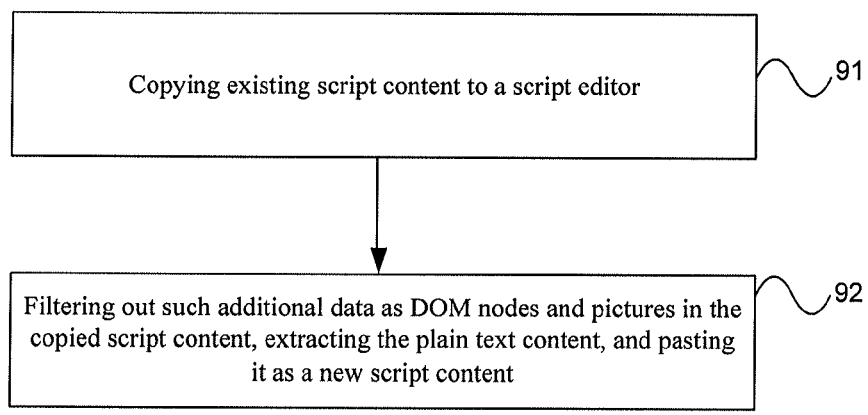
FIG. 8 is a schematic diagram of application of the method shown in FIG. 7.
FIG. 9 is a flowchart of a fifth embodiment of the method for editing scripting language based on WEB of the present invention.

Step 71: checking whether or not the script content complies with grammar, and if not, feeding back error type, error indication information and/or error position information, and indicating the error position in the script editing area with highlighted red background, as shown in FIG. 8.

Step 72: checking whether or not the service character of the script content meets corresponding service rules according to different using scenarios, if not, feeding back error type, error indication information and/or error position information, and indicating the error position in the script editing area with highlighted red background; and if so, indicating that the scrip content meets service characteristic and can be stored.

If the scripting language is a Python script, the error type is kept consistent with the Python standard. Upon the user has edited the script, performing the grammar checking by clicking the Check or Save key on the keyboard. Such information as script content and using scenario of the WEB client is transmitted to the WEB server for checking. It should be noted that the grammar checking may be performed after the script has been completely edited, or may be performed in real time during the process of editing. The two cases are both within the disclosure of the embodiments of the present invention.

It is inevitable for the user to make errors in compiling script codes, and the grammar checking may prevent the errors of script codes from affecting the system, thereby improving the security of operation of the system.

A fifth embodiment of the method for editing scripting language based on WEB is shown in FIG. 9. This embodiment is a supplementary method with respect to the first embodiment shown in FIG. 1, and in practice, this embodiment may be performed in synchronization with the first embodiment shown in FIG. 1, the second embodiment shown in FIG. 3, the third embodiment shown in FIG. 5 and the fourth embodiment shown in FIG. 7.

Step 91: copying existing script content to a script editor.

Step 92: filtering out such additional data as DOM nodes and pictures in the copied script content, extracting the plain text content, and pasting it as a new script content. After pasting, the new script content is colored based on grammar according to the steps of the embodiment shown in FIG. 2.

The copying of the script content may be performed at any time needed in the procedure of script editing. For example, it may be performed during inputting codes, or may be performed after completion of inputting complete code blocks, etc. However, it is not limited by the embodiments of the present invention.

The user can copy the content from an existing script to the script editor, and create a new script by making amendments to the copied content, so as to reduce the effort in script editing.

The online script IDE function provided in the embodiments of the present invention strongly supports the development and expansibility of the system, and may support various scenarios, such as QOS control, and complicated flows, in which the user requires to perform flexible and complicated control. With the improvement of the capability of customization of the system, many of user demands may be satisfied by script customization, thereby reducing the demand for the version of the system.

The embodiments of the present invention may be applied to various scenarios of the Web system. For example, with the cooperation of a background service engine, the development and expansibility of the system may be improved; with the modification of the scripts of the system, the functions of the system may be updated through the WEB; and online debugging and execution functions may be realized, so as to complete test verification and execution of the business functions.

The embodiments of the present invention further provide a system for editing scripting language based on WEB.

Figure 10:
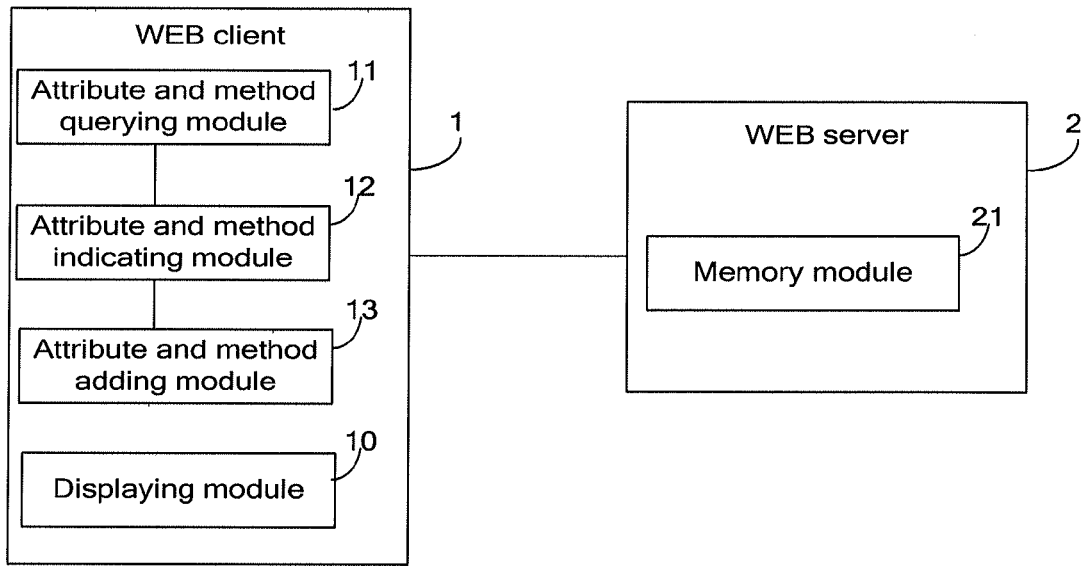
FIG. 10 is a schematic diagram of a first embodiment of the system for editing scripting language based on WEB of the present invention.

A first embodiment of the system for editing scripting language based on WEB is shown in FIG. 10. This embodiment corresponds to the first embodiment of the method for editing scripting language based on WEB shown in FIG. 1.

The system for editing scripting language based on WEB includes a WEB client 1 and a WEB server 2, the WEB server 2 including a memory module 21, and the WEB client 1 including a displaying module 10, an attribute and method querying module 11, an attribute and method indicating module 12, and an attribute and method adding module 13.

The attribute and method querying module 11 is configured to query the memory module of the WEB server about an available object in a current script usage scenario, as well as attribute and method of the available object; the displaying module 10 is configured to generate a script editing interface according to the queried available object in the current script usage scenario and the attribute and method of the available object, and display a script content input by an inputting device in the editing interface; the attribute and method indicating module 12 is configured to check whether or not the script content before the confirmation identifier is an indication object capable of automatically indicating, after acquire confirmation identifier of the edited content; if so, acquire, from the attribute and method querying module 11, an attribute and method of the object, and display the acquired attribute and method related to the indication object on a prompt box formed in the script editing interface for selection; and the attribute and method adding module 13 is configured to add the attribute and method of the indication object selected from the prompt box after the indication object.

Figure 11:
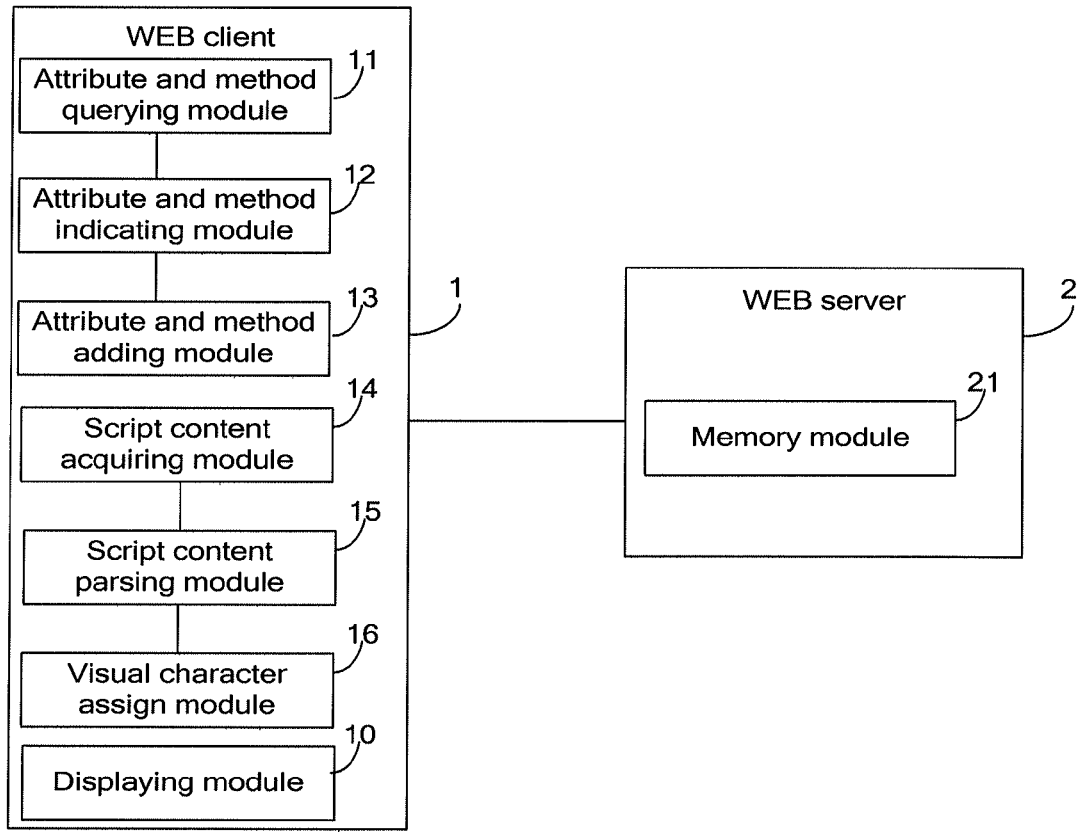
FIG. 11 is a schematic diagram of a second embodiment of the system for editing scripting language based on WEB of the present invention.

A second embodiment of the system for editing scripting language based on WEB is shown in FIG. 11. This embodiment corresponds to the second embodiment of the method for editing scripting language based on WEB shown in FIG. 3.

The system for editing scripting language comprises a WEB client 1 and a WEB server 2, the WEB server 2 including a memory module 21, and the WEB client 1 including a displaying module 10, an attribute and method querying module 11, an attribute and method indicating module 12, an attribute and method adding module 13, a script content acquiring module 14, a script content parsing module 15 and a visual character assign module 16.

The script content acquiring module 14 is configured to acquire the script content in the editing interface; the script content parsing module 15 is configured to parse the acquired script content to acquire keywords, character strings and notations in the script content; and the visual character assign module 16 is configured to assign identifiable visual characters to the acquired keyword, character string and notation in the script content.

Other modules contained in the WEB client 1 and WEB server 2 are the same as those of the embodiment shown in FIG. 10, whose detailed description would be omitted.

Figure 12:
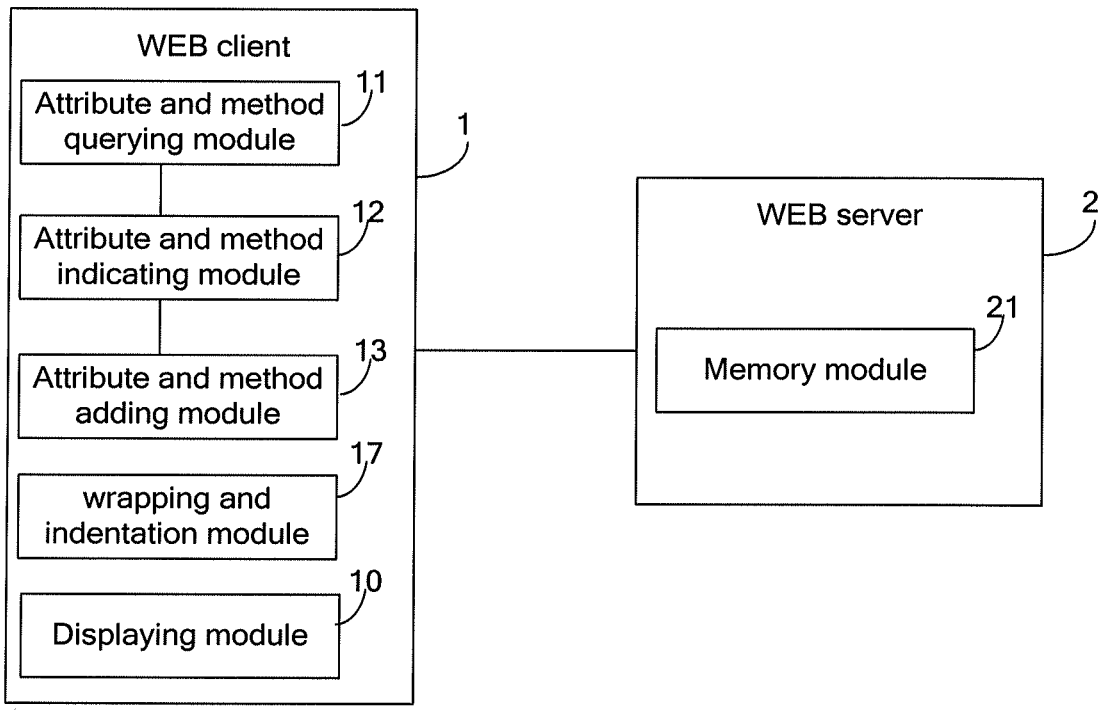
FIG. 12 is a schematic diagram of a third embodiment of the system for editing scripting language based on WEB of the present invention.

A third embodiment of the system for editing scripting language based on WEB is shown in FIG. 12. This embodiment corresponds to the third embodiment of the method for editing scripting language based on WEB shown in FIG. 5.

The system for editing scripting language comprises a WEB client 1 and a WEB server 2, the WEB server 2 including a memory module 21, and the WEB client 1 including a displaying module 10, an attribute and method querying module 11, an attribute and method indicating module 12, an attribute and method adding module 13 and a wrapping and indentation module 17.

The wrapping and indentation module 17 is configured to determine whether or not the input script content is wrapped; if so, add a level of indentation to the input script content; if not, make the indentation of the input script content consistent with the indentation of the script content of last line; and insert a space necessary for the indentation, and shift the cursor to the position after indentation.

Other modules contained in the WEB client 1 and WEB server 2 are the same as those of the embodiment shown in FIG. 10, whose detailed description would be omitted.

Figure 13:
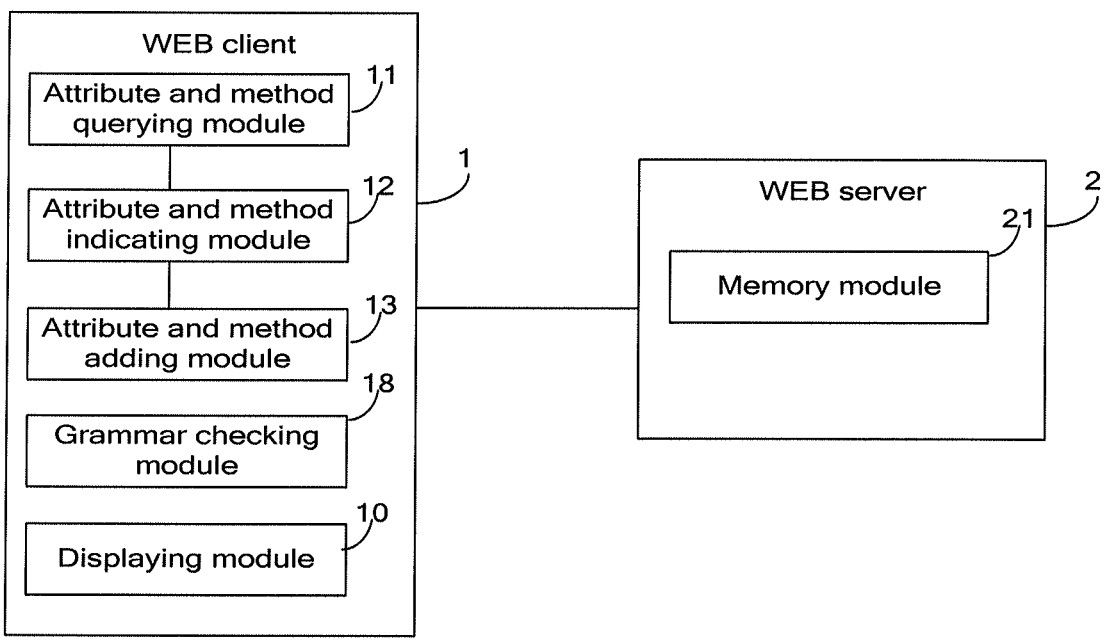
FIG. 13 is a schematic diagram of a fourth embodiment of the system for editing scripting language based on WEB of the present invention.

A fourth embodiment of the system for editing scripting language based on WEB is shown in FIG. 13. This embodiment corresponds to the fourth embodiment of the method for editing scripting language based on WEB shown in FIG. 7.

The system for editing scripting language comprises a WEB client 1 and a WEB server 2, the WEB server 2 including a memory module 21, and the WEB client 1 including a displaying module 10, an attribute and method querying module 11, an attribute and method indicating module 12, an attribute and method adding module 13 and a grammar checking module 18.

The grammar checking module 18 is configured to check whether or not the script content complies with grammar, and if not, the grammar checking module 18 feed back error type, error indication information and/or error position information, and indicate the error position in the script editing area with highlighted red grounding; check whether or not the service characteristic of the script content meets corresponding service rules according to different using scenarios, if not, feed back error type, error indication information and/or error position information, and indicating the error position in the script editing area with highlighted red grounding; and if so, indicate that the scrip content meets service characteristic and can be stored.

Other modules contained in the WEB client 1 and WEB server 2 are the same as those of the embodiment shown in FIG. 10, whose detailed description would be omitted.

Figure 14:
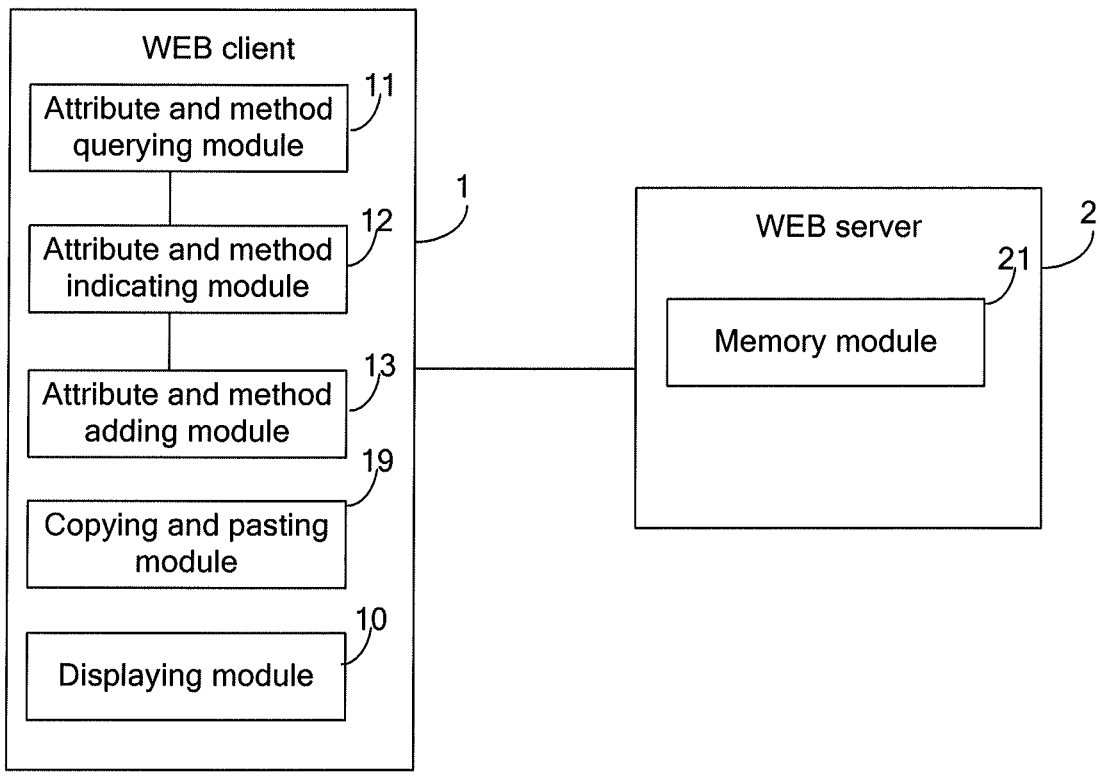
FIG. 14 is a schematic diagram of a fifth embodiment of the system for editing scripting language based on WEB of the present invention.

A fifth embodiment of the system for editing scripting language based on WEB is shown in FIG. 14. This embodiment corresponds to the fifth embodiment of the method for editing scripting language based on WEB shown in FIG. 9.

The system for editing scripting language comprises a WEB client 1 and a WEB server 2, the WEB server 2 including a memory module 21, and the WEB client 1 including a displaying module 10, an attribute and method querying module 11, an attribute and method indicating module 12, an attribute and method adding module 13 and a copying and pasting module 19.

The copying and pasting module 19 is configured to copy existing script content, extract plain text content from the copied script content, and paste it as a new script content.

It should be understood by those skilled in the art that the functional modules concerned in the above embodiments may constitute one embodiment.

The embodiments of the present invention further provide a WEB client.

Figure 15:
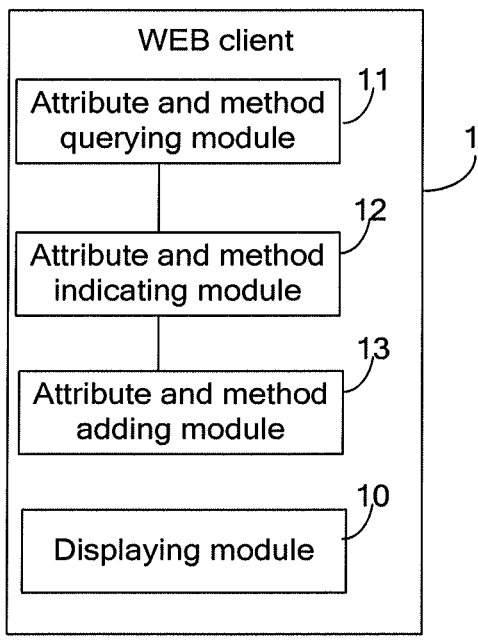
FIG. 15 is a schematic diagram of a first embodiment of the WEB client of the present invention.

A first embodiment of the WEB client is shown in FIG. 15. This embodiment corresponds to the first embodiment of the method for editing scripting language shown in FIG. 1 and the first embodiment of the system for editing scripting language based on WEB shown in FIG. 10.

The WEB client 1 comprises a displaying module 10, an attribute and method querying module 11, an attribute and method indicating module 12, and an attribute and method adding module 13.

The attribute and method querying module 11 is configured to query the memory module of the WEB server about an available object in a current script usage scenario, and attribute and method of the available object; the displaying module 10 is configured to generate a script editing interface according to the queried available object in the current script usage scenario and the attribute and method of the available object, and display a script content input by an inputting device in the editing interface; the attribute and method indicating module 12 is configured to check whether or not the script content before the confirmation identifier is an indication object capable of automatically indicating, after acquire confirmation identifier of the edited content; if so, acquire, from the attribute and method querying module 11, an attribute and method of the object, and display the acquired attribute and method related to the indication object on a prompt box formed in the script editing interface for selection; and the attribute and method adding module 13 is configured to add the attribute and method of the indication object selected from the prompt box after the indication object.

Figure 16:
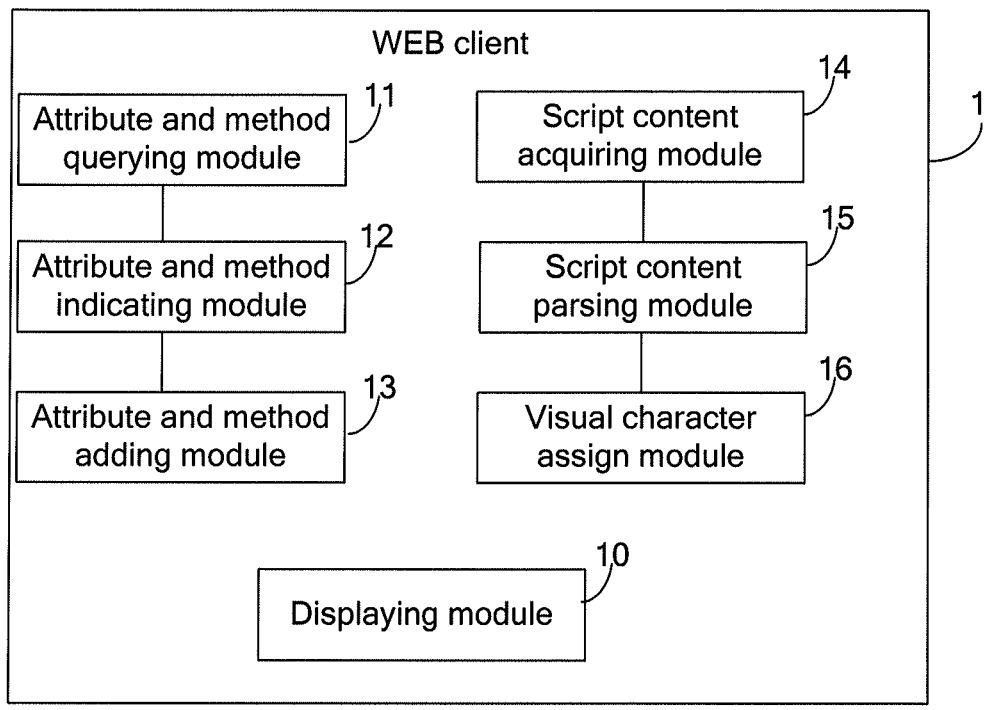
FIG. 16 is a schematic diagram of a second embodiment of the WEB client of the present invention.
Figure 17:
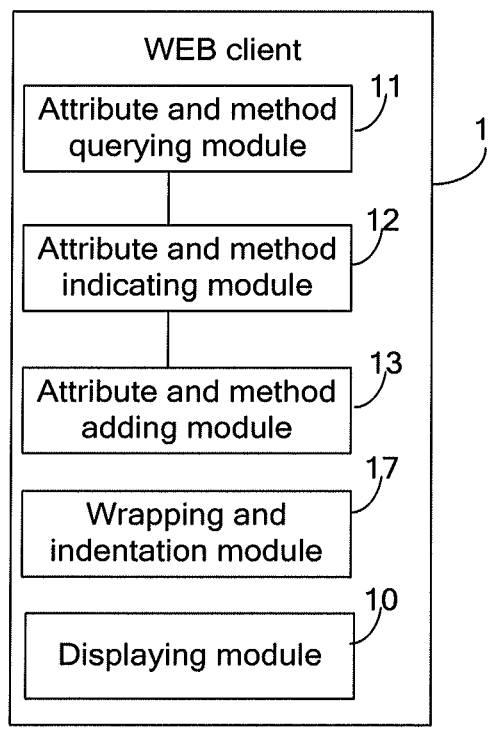
FIG. 17 is a schematic diagram of a third embodiment of the WEB client of the present invention.
Figure 18:
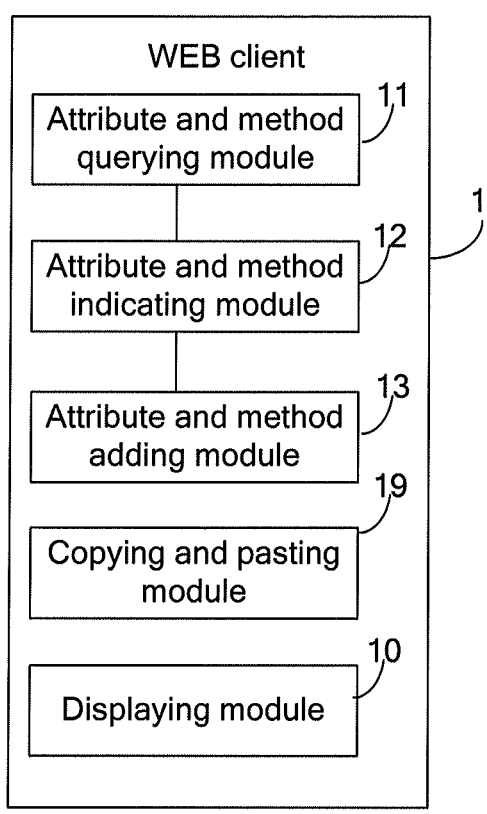
FIG. 18 is a schematic diagram of a fourth embodiment of the WEB client of the present invention.

A second, third and fourth embodiment of the WEB client are shown respectively in FIGS. 16, 17 and 18. The second, third and fourth embodiment of the WEB client 1 are respectively the same as the WEB client 1 of the embodiments shown respectively in FIGS. 11, 12 and 14, whose detailed description would be omitted.

It should be understood by those skilled in the art that the device modules in the embodiments of the present invention are divided with respect to functions, and the actual structures may be detachment or combination of these functional modules.

The reference numbers in the above embodiments of the present invention are merely used for the purpose of explanation, and are not representative of advantages or disadvantages of the embodiments.

The disclosure of the claims is also the protection scope of the embodiments of the present invention.

It should be understood by a skilled in the art that all or part of the processing in the method of the above embodiments may be executed by related hardware under the instructions of a program, and the program may be stored in a computer-readable storage medium.

What are described above are merely preferred embodiments of the present invention, and are not intended to limit the protection scope of the present invention. Any modification, equivalents, and improvements, etc. made within the spirits and principle of the present invention should falls within the protection scope of the present invention.

What is claimed is:

1. A method for editing scripting language based on WEB, the method comprising:
   querying a server about available object in a current script usage scenario, as well as attribute and method of the available object;
   generating a script editing interface according to the queried available object in the current script usage scenario and the attribute and method of the available object, and displaying a script content input by an inputting device in the script editing interface;
   acquiring confirmation identifier of the edited script content, and checking whether or not the script content before the confirmation identifier is an indication object capable of automatically indicating; if so, acquiring, from the attribute and method of the available object, an attribute and method related to the indication object, and displaying the acquired attribute and method related to the indication object on a prompt box formed in the script editing interface for selection; and
   adding the attribute and method of the indication object selected from the prompt box after the indication object.

2. The method according to claim 1, wherein, before adding the attribute and method of the indication object selected from the prompt box after the indication object, the method further comprises:
   acquiring a character string from the script content that was later input into in the script editing interface, and using the acquired character string to filter the attribute and method displayed in the prompt box.

3. The method according to claim 1, wherein, after displaying a script content input by an inputting device in the editing interface, the method further comprises:
   acquiring the script content in the editing interface;
   parsing the acquired script content, and acquiring keywords, character strings and notations in the acquired script content; and
   giving identifiable visual characters to the acquired keywords, character strings and notations in the script content.

4. The method according to claim 3, wherein, the identifiable visual characters comprise color, brightness, and font size, or a combination of two or three of color, brightness, and font size.

5. The method according to claim 1, wherein displaying a script content input by an inputting device in the editing interface further comprises:
   determining whether the input script content is wrapped; if so, adding an indentation of one level to the input script content; and if not, making the indentation of the input script content consistent with the indentation of the script content of last line.

6. The method according to claim 5, wherein adding an indentation of one level to the input script content comprises:
   inserting a space necessary for the indentation, and shifting the cursor to the position after indentation.

7. The method according to claim 1, further comprising:
   checking whether the script content complies with grammar, and if not, feeding back error type and at least one of error indication information and error position information.

8. The method according to claim 7, further comprising:
   checking whether the service character of the script content meets corresponding service rules according to different using scenarios, if not, feeding back error type and at least one of error indication information and error position information.

9. The method according to claim 1, further comprising:
   copying existing script content; and
   extracting a plain text content from the copied script content, and pasting it as a new script content.

10. A system for editing scripting language based on WEB, the system including comprising: a WEB client and a WEB server, the WEB server including comprising a memory module, and the WEB client comprising a displaying module, an attribute and method querying module, an attribute and method indicating module, and an attribute and method adding module, wherein:
    the memory module is configured to store available objects in various script usage scenarios, as well as attribute and method of the available object;

the attribute and method querying module, configured to query the memory module of the WEB server about an available object in a current script usage scenario, and attribute and method of the available object;

the displaying module is configured to generate a script editing interface according to the queried available object in the current script usage scenario and the attribute and method of the available object, and display a script content input by an inputting device in the editing interface;

the attribute and method indicating module is configured to acquire confirmation identifier of the edited content, and checking whether or not the script content before the confirmation identifier is an indication object capable of automatically indicating; if so, acquire, from the attribute and method of the available object, an attribute and method related to the indication object, and display the acquired attribute and method related to the indication object on a prompt box formed in the script editing interface for selection; and the attribute and method adding module is configured to add the attribute and method of the indication object selected from the prompt box after the indication object.

11. The system according to claim 10, wherein the WEB client further comprises a script content acquiring module, a script content parsing module and a visual character assign module; wherein:

the script content acquiring module is configured to acquire the script content in the editing interface;

the script content parsing module is configured to parse the acquired script content to acquire keywords, character strings and notations in the script content; and the visual character giving module is configured to assign identifiable visual character to the acquired keyword, character string and notation in the script content.

12. The system according to claim 10, wherein the WEB client further comprises a wrapping and indentation module that is configured to determine whether or not the input script content is wrapped; if so, add a level of indentation to the input script content; if not, make the indentation of the input script content consistent with the indentation of the script content of last line.

13. The system according to claim 10, wherein the WEB client further comprises a grammar checking module configured to check whether or not the script content complies with grammar, and if not, the grammar checking module feeds back error type and at least one of error indication information and error position information.

14. The system according to claim 10, wherein the WEB client further comprises a copying and pasting module that is configured to copy existing script content, extract plain text content from the copied script content, and paste it as a new script content.

15. A WEB client, comprising: a displaying module, an attribute and method querying module, an attribute and method indicating module, and an attribute and method adding module, wherein:

the attribute and method querying module is configured to query the memory module of the WEB server about an available object in a current script usage scenario, and attribute and method of the available object;

the displaying module is configured to generate a script editing interface according to the queried available object in the current script usage scenario and the attribute and method of the available object, and display a script content input by an inputting device in the editing interface;

the attribute and method indicating module is configured to acquire confirmation identifier of the edited content, and checking whether or not the script content before the confirmation identifier is an indication object capable of automatically indicating; if so, acquire, from the attribute and method querying module, an attribute and method related to the indication object, and display the acquired attribute and method related to the indication object on a prompt box formed in the script editing interface for selection; and the attribute and method adding module is configured to add the attribute and method of the indication object selected from the prompt box after the indication object.

16. The WEB client according to claim 15, wherein the WEB client further comprises a script content acquiring module, a script content parsing module and a visual character assign module; wherein:

The script content acquiring module is configured to acquire the script content in the editing interface;

the script content parsing module is configured to parse the acquired script content, and acquire keywords, character strings and notations in the script content; and the visual character assign module is configured to assign identifiable visual characters to the acquired keyword, character string and notation in the script content.

17. The WEB client according to claim 15, wherein the WEB client further comprises a wrapping and indentation module configured to determine whether or not the input script content is wrapped; if so, add a level of indentation to the input script content; if not, make the indentation of the input script content consistent with the indentation of the script content of last line.

18. The WEB client according to claim 15, wherein the WEB client further comprises a grammar checking module configured to check whether or not the script content complies with grammar, and if not, the grammar checking module feed back error type and at least one of error indication information and error position information.

19. The WEB client according to claim 15, wherein the WEB client further comprises a copying and pasting module configured to copy existing script content, extract plain text content from the copied script content, and paste the extracted plain text content as a new script content.

* * * * *